(12) United States Patent
Homayoun et al.

(10) Patent No.: US 6,748,171 B1
(45) Date of Patent: Jun. 8, 2004

(54) METHOD AND SYSTEM FOR PROVIDING MULTIPLE CLASSES OF SERVICES IN DENSE WAVELENGTH DIVISION MULTIPLEXING OPTICAL NETWORKS

(75) Inventors: Fereidoun Homayoun, Plano, TX (US); Saleh Faruque, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/538,394

(22) Filed: Mar. 29, 2000

(51) Int. Cl.$^7$ .................................................. H04J 4/00
(52) U.S. Cl. ............................ 398/77; 348/78; 348/79; 475/146
(58) Field of Search .................. 398/78, 75, 77, 398/89, 99, 79; 375/146

(56) References Cited

U.S. PATENT DOCUMENTS

| | | | | |
|---|---|---|---|---|
| 4,989,199 A | * | 1/1991 | Rzeszewski | ................. 398/46 |
| 5,805,583 A | * | 9/1998 | Rakib | .......................... 370/342 |
| 5,867,290 A | | 2/1999 | Dutt et al. | ................... 359/115 |
| 6,154,456 A | * | 11/2000 | Rakib et al. | ................. 370/342 |
| 6,025,944 A1 | * | 2/2002 | Mendez et al. | ................ 398/78 |
| 6,351,498 B1 | * | 2/2002 | Yamao et al. | ................ 375/260 |

FOREIGN PATENT DOCUMENTS

EP    0367 452 A2    10/1989    ............ H04J/14/02

OTHER PUBLICATIONS

Antonio J. Mendez, *Varieties and Characteristics of Discrete Spectral Encoding (DSE)*; 1996 IEEE; pp. 438–444.
Yile Guo, James F. Young, *Wavelength Encoding to Reduce Four–Wave Mixing Crosstalk in Multi–Wavelength Channels*; 1997 IEEE; pp. 230–231.
International Search Report dated Apr. 19, 2001.

* cited by examiner

Primary Examiner—Leslie Pascal
Assistant Examiner—Dzung Tran
(74) Attorney, Agent, or Firm—Haynes and Boone, LLP

(57) ABSTRACT

A system and method is disclosed for providing multiple classes of communication services on a high-speed, high capacity communication platform over Wave Division Multiplexing (WDM) networks. A predetermined set of light channels of a WDM network is partitioned into one or more sub groups based on their wavelengths, each sub group is assigned for providing exclusively one communication service such as video, audio or data communication services. Each light channel is modulated by a predetermined set of orthogonal codes so that neighboring channel interferences can be minimized. Further, the predetermined set of orthogonal codes can be further divided into an even group and an odd group. These two groups of codes are assigned to two immediate neighboring light channels. As an alternative, multiple light channels can share a single set of predetermined orthogonal codes provided a mechanism is implemented for a plurality of use terminals connected to the optical network to monitor available orthogonal code instantly.

21 Claims, 2 Drawing Sheets

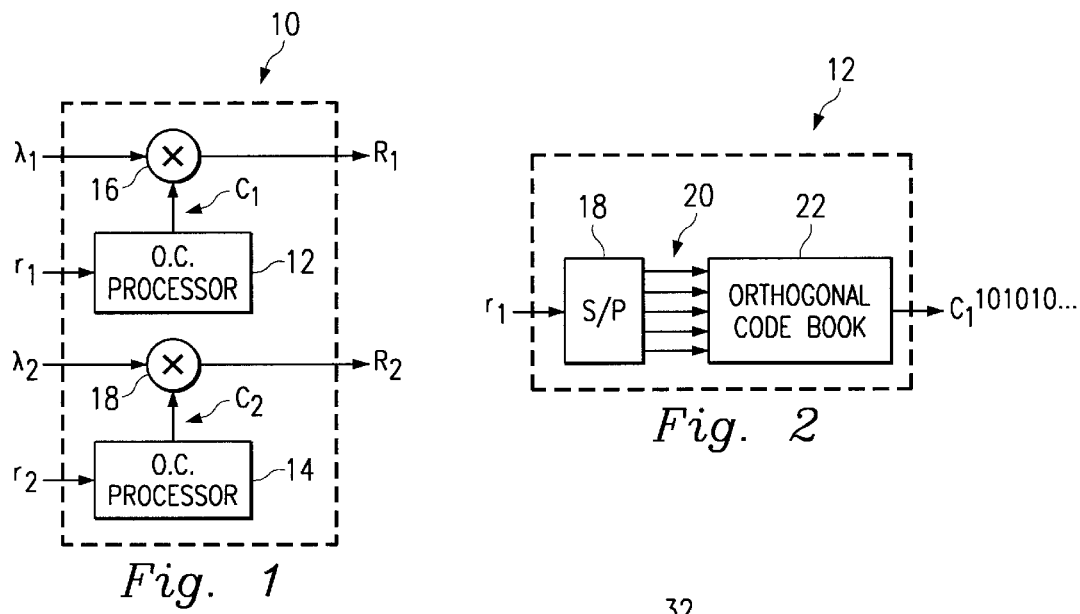
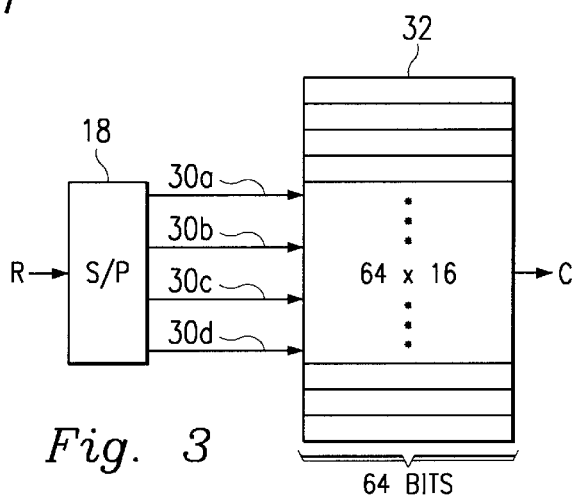
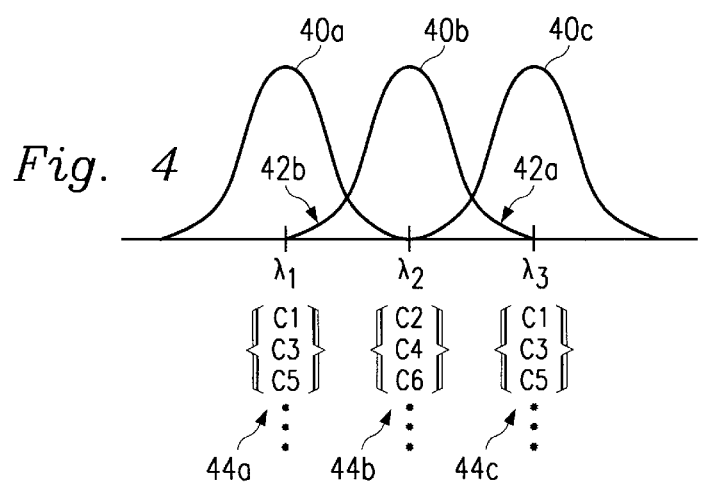

METHOD AND SYSTEM FOR PROVIDING MULTIPLE CLASSES OF SERVICES IN DENSE WAVELENGTH DIVISION MULTIPLEXING OPTICAL NETWORKS

CROSS REFERENCE

This application relates to U.S. Pat. Ser. No. 09/455,090 filed on Dec. 6, 1999, Ser. No. 09/522,161 filed on Mar. 9, 2000, both of which are herein incorporated by reference.

BACKGROUND OF THE INVENTION

The present invention relates generally to telecommunication networks, and more particularly, to a system and method for providing high speed data transmission services for multiple classes of services over an optical network.

Optical networks are high-capacity telecommunications networks based on optical technologies and components that provide routing, grooming, and restoration at the wavelength level. They provide higher capacity and reduced costs for new applications such as the Internet, video and multimedia interaction, and advanced digital services. Wavelength division multiplexing (WDM) technology is widely used in optical networks to provide additional capacity on existing fibers. Using the WDM technology, the components of the optical network are defined according to how the wavelengths are transmitted, groomed, or implemented in the network.

WDM technology combines many signals, or "virtual" fibers, onto a single physical fiber by transmitting each signal at a different frequency. Furthermore, with the improvement of optical filters and other laser technology, the number of effective channels on a single physical fiber for carrying the signals is continually increasing. Currently, dense wavelength division multiplexing (DWDM) technology allows a single fiber to provide 40 or 80 channels for carrying signals. Consequently, by implementing DWDM systems and optical amplifiers, networks can now provide a variety of channels with different bit rates, e.g., OC-48 or OC-192, over a single fiber.

One major problem in designing a DWDM system is creating a channel spacing plan. Although the International Telecommunication Union (ITU) has published a standard set of frequencies based on different channel spacing, the 50 GHz and 100 GHz plans are still the most commonly used. Furthermore, as these systems are rapidly deployed, it is most likely that both OC-48 and OC-192 channels will be carried. However, at a low channel spacing plan such as 50 GHz, OC-192 channels can not be adjacent because an interference will ensue (referred to as "neighboring channel interference"). Moreover, this interference problem may not be prevented by simply using filtering mechanisms. Due to this neighboring channel interference, the available number of OC-192 channels for a channel spacing plan of 50 GHz is effectively cut in half.

With the implementation of the optical networks, opportunities exist for providing high speed data communication services for multimedia applications required by today's computer network users. Video, audio, and data information are considered to be the most popular classes of information that need to be supported. Therefore, the optical networks need to integrate a range of services on a single platform, to have system scalability to suit different groups of users, and to provide end-to-end error free communication services for mission critical applications.

It is thus desired to provide a mechanism for supporting multiple classes of communication services on the optical networks while reducing neighboring channel interference and channel dispersion.

SUMMARY OF THE INVENTION

An improved system and method is hereby disclosed for providing high-speed and high capacity data communication services over Wave Division Multiplexing (WDM) optical networks for multiple classes of services.

In one embodiment of a WDM network system, the system can employ a first incoming user data stream to select an n-bit orthogonal code from a predetermined code book, and similarly use a second incoming user data stream to select another n-bit orthogonal code from a different orthogonal code book for a neighboring channel. The selected orthogonal codes are then used to modulate the two incoming light channels for the incoming user data streams. With the modulation, the ON/OFF patterns of the light channels become an exact representation of the selected orthogonal codes. Hence, with an appropriate code plan to arrange the code books, the orthogonally encoded first and second incoming user data streams are interference proof to each other because they are orthogonal to each other. By doing so, the neighboring channel interference can be eliminated for narrowly spaced communication channels such as the OC-192 channels with a 50 GHz spacing.

Since the codes selected to modulate two neighboring channels determine whether the modulated light channels will interfere with each other, designing the predetermined code plan is very important and must assure that each light channel is isolated from its neighbor. In one embodiment of the present invention, a complete set of n-bit orthogonal codes (e.g., $C_1$–$C_{2n}$ wherein "n" is an integer) can first be partitioned into at least two groups (e.g., an odd group having $C_1$, $C_3$, . . . , $C_{2n-1}$, and an even group having $C_2$, $C_4$, . . . $C_{2n}$). The odd group is assigned to a first orthogonal code book, and the even group is assigned to a second orthogonal code book. Since the first and second orthogonal code books are used for two neighboring light channels, neighboring channel interference is minimized. Further, the first orthogonal code book can be used again for modulating a third light channel that borders with the second light channel (but not with the first light channel). This arrangement further ensures that neighboring channels are isolated by using codes orthogonal to each other.

In order to provide multiple classes of services on a quality communication platform, a predetermined group of light channels are first partitioned into sub groups. Each sub group is then assigned to a predetermined class of services such as those exclusively for video, voice, or data. Moreover, for the purpose of restraining the channel dispersion problem, low bit rates are used for light channels having comparatively longer wavelengths, and high bit rates are used for light channels having shorter wavelengths.

In addition to grouping the orthogonal codes and grouping the light channels, another embodiment of the present invention also provides a self channel assignment mechanism so that information can be immediately transmitted on an available light channel. In this embodiment, an Optical Code Sense Multiple Access Protocol is implemented so that the code plan only needs to provide a predetermined set of orthogonal codes for all the light channels. With the implementation of the Optical Code Sense Multiple Access Protocol and a code correlator, all the orthogonal codes used in the network are monitored by each user terminal connected to the network. When an orthogonal code is available for modulating a light channel, a user terminal instantly selects that orthogonal code for modulating the light channel, and starts to transmit information through that modulated light channel.

BRIEF DESCRIPTION OF THE DRAWINGS

FIG. 1 is a schematic for one embodiment of a Wave Division Multiplexing (WDM) communication system in accordance with the present invention.

FIG. 2 is a schematic of one of the orthogonal code processors of the communication system of FIG. 1.

FIG. 3 is a schematic diagram for one example of the orthogonal code processor described in FIG. 2.

FIG. 4 is a schematic showing three neighboring light channels being modulated with grouped orthogonal codes according to one embodiment of the present invention.

DESCRIPTION OF THE PREFERRED EMBODIMENT

Figure 5:
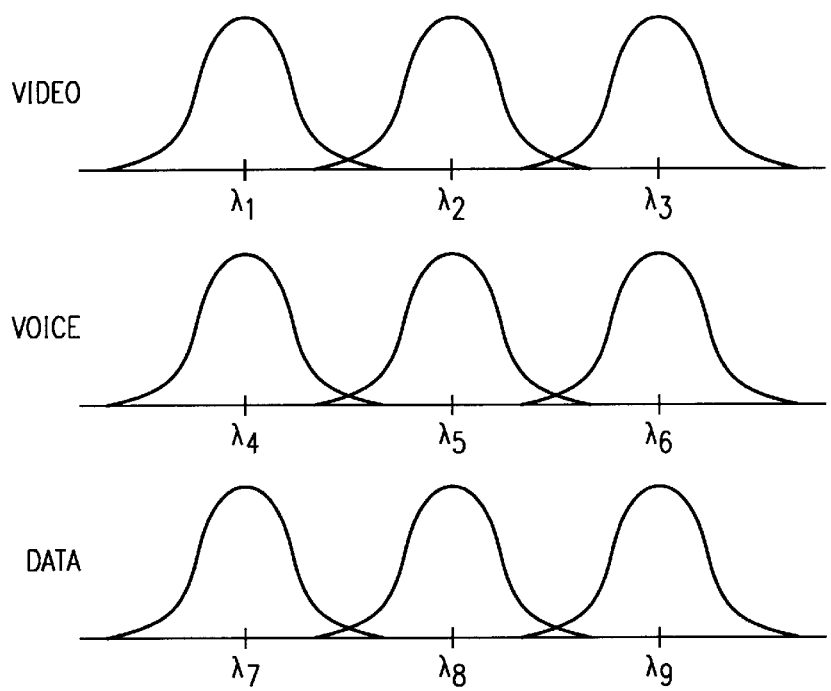
FIG. 5 is a diagram illustrating a method of partitioning a group of light channels for supporting multiple classes of services.

Referring now to FIG. 1, the reference numeral 10 designates a simplified WDM communication system for implementing one embodiment of the present invention. The system 10 employs narrowly spaced communication channels such as OC-192 channels. Two communication channels, $\lambda_1$ and $\lambda_2$, represent two neighboring light channels. A first user data stream $r_1$ is carried on the light channel $\lambda_1$, and a second user data stream $r_2$ on the light channel $\lambda_2$. The user data streams $r_1$ and $r_2$ are first processed by orthogonal code processors 12 and 14, respectively. The light channels $\lambda_1$ and $\lambda_2$ are further modulated by modulators 16 and 18, respectively, using orthogonal codes generated from the orthogonal code processors 12 and 14, respectively.

Since each light channel is in fact a beam of light at a certain frequency, the channel is modulated by controlling the ON/OFF pattern of the light according to an orthogonal code $C_1$ or $C_2$ generated by the orthogonal code processor 12 or 14. Consequently, the light channel can be modulated to be an exact representation of the generated orthogonal code by appropriately controlling its ON/OFF pattern. Since a predetermined code plan can assure that the orthogonal code selected by the orthogonal code processor 12 is different from that of the orthogonal code processor 14, two distinctive output data streams $r_1$ and $r_2$, i.e., two modulated light channels, can successfully transmit data without neighboring channel interferences.

Referring now to FIG. 2, the orthogonal code processor 12 is similar in configuration to the processor 14 and will be discussed in greater detail below, with differences between the two processors discussed where necessary. When the incoming user data stream $r_1$ is provided to the orthogonal code processor 12, it is first split into a plurality of sub streams of data 20 by a splitter 18. The sub streams of data 20 are then provided to an orthogonal code book 22. The orthogonal code book 22 selects, or "maps," a unique orthogonal code of n-bits in length as an output $C_1$. Similarly, the orthogonal code processor 14 provides an output $C_2$.

One method of selecting an orthogonal code from an orthogonal code book using an incoming data is described in the U.S. patent application Ser. No. 09/455,090, filed on Dec. 6, 1999 and herein incorporated by reference. It is understood that the splitter 18 can split the incoming user data stream $r_1$ into different numbers of sub streams depending on a predetermined code selection plan. The code selection plan can be based on the selection of a Read Only Memory 24 of a specific size, the length of the orthogonal code, and/or other factors. It is also understood that the orthogonal code processors 12 and 14 can be structurally identical except that each contains a different orthogonal code book according to the predetermined code plan so that the codes generated by one of the processors ($C_1$ or $C_2$) will not interfere with those from the other.

Referring again to FIG. 1, by installing the predetermined code plan, the orthogonal codes generated by the orthogonal code processors 12 and 14 can always be maintained "orthogonal" to each other. Hence, using these two non-interfering codes to modulate the neighboring light channels $\lambda_1$ and $\lambda_2$, information transferred through these channels does not encroach on one another, even if the two channels become partially overlapped because of insufficient spacing. It is further understood that a receiving instrument can easily decode the orthogonal code carried in the light channel if the code plan is known to the receiving instrument.

Turning now to FIG. 3, one example of the orthogonal code processor 12 is shown in greater details. An incoming data stream "R" is split into four (4) parallel sub streams 30a, 30b, 30c, and 30d by the splitter 18. The four sub streams are then grouped and fed into a Read Only Memory (ROM) 32. In the present example, the input to the ROM 32 is four (4) bits long (decided by the predetermined code plan), so the ROM 32 has to be an n×16 matrix so that every four input bits select a unique output code "C" of a predetermined length of n bits. In this example, the length of each code or each row in the ROM is set at 64 bits. Therefore, in this embodiment, the ROM 30 is a 64×16 ROM. It is understood that the predetermined code plan can decide the length of the orthogonal code, the number of sub streams split from the incoming data stream, and other parameters needed with the consideration of various performance characteristics such as data transmission speed, error correction capability, etc.

Now referring to FIG. 4, three neighboring light channels 40a, 40b, and 40c are represented in wave forms having their respective wavelengths of $\lambda_1$, $\lambda_2$, and $\lambda_3$. For each light channel (e.g., light channel 40b), there are two immediate neighboring light channels (e.g., light channel 40a and 40c). In some instances, these three light channels can be narrowly spaced. It is therefore possible that considerable channel overlapping between two neighboring channels may occur such as at area 42a or 42b. This overlapping area represents the neighboring channel interference problem, which is one of the major contributing factors for limiting the capacity of a WDM optical network. This is also a reason why narrowly spaced networks can not gracefully carry mixed channels having different bit rates. For instance, a mix of OC-48 and OC-192 channels on a 50 GHz spaced channel plan is still not supported by today's state of art technologies.

In addressing these problems, the neighboring channels must first be isolated as much as possible. In one of the embodiment of the present invention, an appropriately designed code plan ensures that all light channels will be modulated by codes orthogonal to each other. For example, a complete set of n-bit orthogonal codes (e.g., $C_1$–$C_{2n}$ wherein "n" is an integer) can first be partitioned into at least two sub groups (e.g., an odd group 44a having $C_1$, $C_3$, . . . ,$C_2n-1$, and an even group 44b having $C_2$, $C_4$, . . .

$C_2n$). The odd group 44a is then assigned to a first orthogonal code book such as the orthogonal code book in the orthogonal coding processor 12 of FIG. 2, and the even group 44b is assigned to a second orthogonal code book such as that in the orthogonal code processor 14 of FIG. 2. Since the first and second orthogonal code books are used for two neighboring light channels as mentioned above, the neighboring channel interference is minimized because the channels are modulated, at any instance, by two codes that are orthogonal to each other. Further, the odd group 44a of orthogonal codes can then be reused for modulating the light channel 40c, which borders with the light channel 40b but not with the light channel 40a. This intelligent arrangement of the orthogonal codes further ensures that a limited set of orthogonal codes can be used with multiple light channels while still having the neighboring channels isolated.

Moving now to FIG. 5, a predetermined group of light channels $\lambda_1$ to $\lambda_9$ are shown. It is understood that only nine (9) light channels are used here for illustrating one embodiment of the present invention, but the total number of light channels in the predetermined group can be any number, depending on the application for the WDM optical network. In order to provide multiple classes of services on a quality communication platform, this group of light channels are first partitioned into several sub groups. Each sub group is then assigned to a predetermined class of service such as for transmitting or receiving video, voice, or data information. For the purpose of the present disclosure, information other than video and audio information are all considered to be data information. For instance, as shown in FIG. 5, $\lambda_1$–$\lambda_3$ can be assigned for exclusively transmitting video information, another sub group $\lambda_4$–$\lambda_6$ can be used exclusively for voice information, and a third sub group $\lambda_6$–$\lambda_9$ exclusively for other data information. It is understood that the optical network can easily detect the different classes of information (e.g., video, voice, and data) since all information is packetized. That is, by incorporating an identifier in the packets, the optical network can separate the information and assign the packets to different light channels to be transmitted.

In another embodiment of the present invention, the method for partitioning the light channels can be fine tuned for the purpose of restraining the channel dispersion problem. Due to the unwanted dispersion problem, repeaters have to be installed for continuing long-haul information transmission. Since channel dispersion is a function of bit rate, carefully and purposefully assigning signals of certain bit rates to corresponding light channels can effectively minimize the channel dispersion problem. In one embodiment of the present invention, the light channels are grouped relatively by their wavelengths. Consequently, low bit rate signals can be transmitted through sub groups of light channels having relatively long wavelengths, while high bit rate signals can be carried on sub groups having relatively short wavelengths.

Moreover, the predetermined assignment of the light channels with different bit rates can also assist the planning of the network performance. For example, the sub group for carrying the video information may need to have a higher bit rate since a video file, by its nature, tends to have more information to be transmitted than a voice file. On the other hand, a voice file can be transmitted at a relative low bit rate while still maintaining the integrity of information. Therefore, by intelligently planning the use of different light channels, the overall system performance can be improved.

Figure 6:
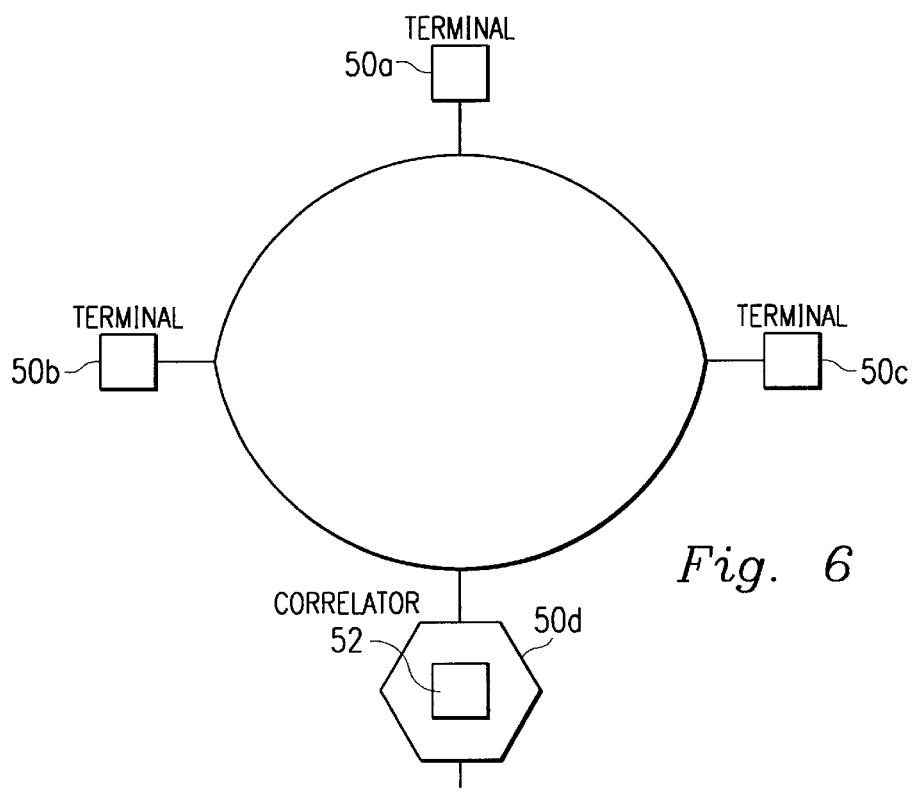
FIG. 6 is a network schematic diagram illustrating an optical network having multiple user terminals integrated with code correlators, according to one embodiment of the present invention.

Referring now to FIG. 6, an optical network is shown with a plurality of user terminals according to another embodiment of the present invention. In this case, the code plan does not have to designate discrete code books in each code processor. It only needs to inform all the users in the network about a set of orthogonal codes that are used in the network and codes that are available for modulating the light channels at any instant.

One embodiment of the present invention thus provides a channel self assignment mechanism so that information can be promptly transmitted on an available light channel. An Optical Code Sense Multiple Access Protocol is implemented as a MAC Layer application so that all the orthogonal codes used in the optical network are monitored by all user terminals 50a, 50b, 50c, and 50d connected to the network. Taking one user terminal 50d as an example, a code correlator 52 embedded in the user terminal 50d functions as a "manager," looking over the usage of all the orthogonal codes used in the network and timely informing all the user terminals about the availability of these codes. In essence, each code processor in each user terminal initially has an identical set of orthogonal codes. However, they are not all available at any given instant. If some of the codes are used for modulating certain light channels, these codes are "blacked out" for modulating other light channels. The code correlator thus can activate and deactivate the codes in the code processor and only have a light channel modulated with an orthogonal code that is not currently used by any other user light channels in the network. Consequently, only when a user terminal (50a, 50b, 50c, or 50d) is ready to transmit information, and only when it finds an available code, it dynamically modulate a light channel with an appropriate code.

The above disclosure provides many different embodiments, or examples, for implementing different features of the invention. Specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for providing multiple classes of services on a communication platform through a Wavelength Division Multiplexing optical network, the optical network having a plurality of user terminals connected thereto, the method comprising:

selecting a predetermined group of light channels;

partitioning one or more subsets of light channels from the predetermined group of light channels based on the light channels' wavelengths;

enabling each user terminal to monitor an availability of one or more orthogonal codes from a predetermined set of orthogonal codes shared by the predetermined group of light channels, wherein each orthogonal code is for modulating a light channel to provide communication services;

selecting at least one available orthogonal code; and orthogonally modulating a light channel using the selected available orthogonal code, wherein each partitioned subset of light channels is used for supporting a class of service on the optical network.

2. The method of claim 1 wherein the classes of services are audio communication services, video communication services, and data communication services.

3. The method of claim 1 wherein one or more subsets of light channels having relatively long wavelengths carry signals having relatively low bit rates, and one or more subsets of light channels having relatively short wavelengths carry signals having relatively high bit rates.

4. The method of claim 3 wherein the signals having high bit rates are used for video communication services.

5. The method of claim 3 wherein the signals having low bit rates are used for audio communication services.

6. The method of claim 1 wherein enabling each user terminal to monitor an availability of one or more orthogonal codes further includes implementing an Optical Code Sense Multiple Access Protocol for the optical network.

7. A method for providing multiple classes of services on a communication platform through a Wavelength Division Multiplexing optical network, the optical network having a plurality of user terminals connected thereto, the method comprising:
   selecting a predetermined group of light channels;
   partitioning one or more subsets of light channels from the selected predetermined group of light channels based on the light channels' wavelengths; and
   orthogonally modulating each light channel by a predetermined set of orthogonal codes, wherein the orthogonally modulating includes:
      partitioning the predetermined set of orthogonal codes into an even number group having all even numbered codes of the predetermined set and an odd number group having all odd numbered codes of the predetermined set;
      assigning the even number group to a first orthogonal code processor for modulating a first light channel;
      assigning the odd number group to a second orthogonal code processor for modulating a second light channel that is a first immediate neighboring channel to the first light channel; and
      re-assigning the even number group to a third orthogonal code processor for modulating a third light channel that is a second immediate neighboring channel of the second light channel, but not an immediate neighboring channel of the first light channel,
   wherein the modulated light channels are isolated from each other, and wherein each partitioned subset of light channels is used for supporting a class of service on the optical network.

8. A method for isolating a light channel from its neighboring light channels in a Wavelength Division Multiplexing optical network, the method comprising the steps of:
   partitioning a predetermined set of orthogonal codes into an even number group having all even numbered codes of the predetermined set and an odd number group having all odd numbered codes of the predetermined set;
   assigning the even number group to a first orthogonal code processor for modulating a first light channel;
   assigning the odd number group to a second orthogonal code processor for modulating a second light channel that is a first immediate neighboring channel to the first light channel; and
   re-assigning the even number group to a third orthogonal code processor for modulating a third light channel that is a second immediate neighboring channel of the second light channel, but not an immediate neighboring channel of the first light channel.

9. A method for providing multiple classes of services on a communication platform through a Wavelength Division Multiplexing optical network, the optical network having a plurality of user terminals connected thereto and a predetermined group of light channels, the method comprising:
   selecting a first subset of light channels from the predetermined group of light channels for providing video communication services;
   selecting a second subset of light channels from the predetermined group of light channels for providing audio communication services;
   selecting a third subset of light channels from the predetermined group of light channels for providing data communication services; and
   orthogonally modulating each light channel by a predetermined set of orthogonal codes, wherein orthogonally modulating includes:
      partitioning a set of orthogonal codes into first and second groups of codes;
      assigning the first group for modulating a first light channel;
      assigning the second group for modulating a second light channel that is a first immediate neighboring channel to the first light channel; and
      re-assigning the first group for modulating a third light channel that is a second immediate neighboring channel of the second light channel, but not an immediate neighboring channel of the first light channel,
   wherein the selection of the first, second, and third subsets of light channels are based on their corresponding wavelengths.

10. The method of claim 9 wherein orthogonally modulating further includes:
   selecting the predetermined set of orthogonal codes shared by the predetermined group of light channels on the optical network;
   enabling each user terminal to monitor one or more available orthogonal codes on the optical network for modulating a light channel for providing communication services; and
   modulating the light channel with one of the available orthogonal codes.

11. The method of claim 10 wherein enabling further includes implementing an Optical Code Sense Multiple Access Protocol for the optical network.

12. The method of claim 9 wherein the first subset of light channels have wavelengths relatively shorter than the second and third subset of light channels, and the second subset of light channels have wavelengths shorter than the third subset.

13. The method of claim 12 wherein the first subset of light channels have relatively higher bit rates used thereon than those for the second and third subsets, and the second subset of light channels have relative higher bit rates used thereon than those for the third subset.

14. A method for providing multiple classes of services on a communication platform through a Wavelength Division Multiplexing optical network, the optical network having a plurality of user terminals connected thereto and a predetermined group of light channels, the method comprising:
   selecting a first subset of light channels from the predetermined group of light channels for providing video communication services;
   selecting a second subset of light channels from the predetermined group of light channels for providing audio communication services;
   selecting a third subset of light channels from the predetermined group of light channels for providing data communication services; and orthogonally modulating each light channel by a predetermined set of orthogonal codes, wherein orthogonally modulating includes:
  partitioning the predetermined set of orthogonal codes into an even number group having all even numbered codes of the predetermined set and an odd number group having all odd numbered codes of the predetermined set;
  assigning the even number group to a first orthogonal code processor for modulating a first light channel;
  assigning the odd number group to a second orthogonal code processor for modulating a second light channel that is a first immediate neighboring channel to the first light channel; and
  re-assigning the even number group to a third orthogonal code processor for modulating a third light channel that is a second immediate neighboring channel of the second light channel, but not an immediate neighboring channel of the first light channel,
wherein the modulated light channels are isolated from each other, and wherein the selection of the first, second, and third subsets of light channels are based on their corresponding wavelengths.

15. A system for providing multiple classes of services on a communication platform through a Wavelength Division Multiplexing optical network, the system comprising:
  a predetermined group of light channels selected from the optical network;
  a plurality of user terminals connected to the optical network;
  means for partitioning one or more subsets of light channels from the predetermined group of light channels based on the light channels' wavelengths; and
  means for selecting a predetermined set of orthogonal codes shared by the predetermined group of light channels in the optical network;
  means for indicating that orthogonal codes from the selected predetermined set of orthogonal codes are available or unavailable;
  means for enabling each user terminal to monitor an availability of the orthogonal codes;
  means for enabling each user terminal to select an available orthogonal code; and
  means for orthogonally modulating each light channel using the selected available orthogonal code,
  wherein each partitioned subset of light channels are used for supporting a class of communication services on the optical network.

16. The system of claim 15 wherein the classes of services are audio communication services, video communication services, and data communication services.

17. The system of claim 15 wherein the means for partitions further include the means for partitioning one or more subsets of light channels having relatively long wavelengths carry signals having relatively low bit rates, and one or more subsets of light channels having relatively short wavelengths carry signals having comparatively high bit rates.

18. The system of claim 17 wherein the signals having high bit rates are used for video communication services.

19. The system of claim 15 wherein the signals having low bit rates are used for audio communication services.

20. The system of claim 15 wherein the means for enabling further includes implementing an Optical Code Sense Multiple Access Protocol for the optical network.

21. A system for providing multiple classes of services on a communication platform through a Wavelength Division Multiplexing optical network, the system comprising:
  a predetermined group of light channels selected from the optical network;
  a plurality of user terminals connected to the optical network;
  means for partitioning one or more subsets of light channels from the predetermined group of light channels based on the light channels' wavelengths; and
  means for orthogonally modulating each light channel by a predetermined set of orthogonal codes, wherein the means for orthogonally modulating includes:
    means for partitioning the predetermined set of orthogonal codes into an even number group having all even numbered codes of the predetermined set and an odd number group having all odd numbered codes of the predetermined set;
    means for assigning the even number group to a first orthogonal code processor for modulating a first light channel;
    means for assigning the odd number group to a second orthogonal code processor for modulating a second light channel that is a first immediate neighboring channel to the first light channel; and
    means for re-assigning the even number group to a third orthogonal code processor for modulating a third light channel that is a second immediate neighboring channel of the second light channel, but not an immediate neighboring channel of the first light channel,
  wherein the modulated light channels are isolated from each other, and wherein each partitioned subset of light channels are used for supporting a class of communication services on the optical network.

* * * * *